United States Patent [19]
Duerksen

[11] Patent Number: 5,145,003
[45] Date of Patent: Sep. 8, 1992

[54] METHOD FOR IN-SITU HEATED ANNULUS REFINING PROCESS

[75] Inventor: John H. Duerksen, Fullerton, Calif.

[73] Assignee: Chevron Research and Technology Company, San Francisco, Calif.

[21] Appl. No.: 733,587

[22] Filed: Jul. 22, 1991

Related U.S. Application Data

[63] Continuation-in-part of Ser. No. 562,779, Aug. 3, 1990, Pat. No. 5,054,551.

[51] Int. Cl.⁵ .................................................. E21B 43/24
[52] U.S. Cl. ..................................... 166/272; 166/50; 166/303
[58] Field of Search ............... 166/272, 303, 260, 261, 166/50

[56] References Cited

U.S. PATENT DOCUMENTS

| | | | |
|---|---|---|---|
| 3,044,545 | 7/1962 | Tooke | 166/260 |
| 3,051,235 | 8/1962 | Banks | 166/261 |
| 3,208,514 | 9/1965 | Den et al. | 166/261 |
| 3,327,782 | 6/1967 | Hujsak | 166/261 |
| 3,994,340 | 11/1976 | Anderson et al. | 166/272 |
| 4,193,454 | 3/1980 | Goldstein | 166/260 X |
| 4,597,441 | 7/1986 | Ware et al. | 166/303 X |
| 4,696,345 | 9/1987 | Hsueh | 166/272 X |
| 4,706,751 | 11/1987 | Gondouin | 166/272 |

Primary Examiner—Stephen J. Novosad
Attorney, Agent, or Firm—Edward J. Keeling; David J. Power

[57] ABSTRACT

Recovery of viscous petroleum such as from tar sands is assisted using a controlled flow of hot fluid and hydrogen-generating gas in a flow path within the formation; thus a solid-wall hollow tubular member in the formation is used for conducting hot fluid to promote hydrogenation in conjunction with a hydrogen-generating gas and reduce viscosity of the petroleum to develop a potential passage in the formation outside the tubular member into which a drive fluid is injected to promote movement of the petroleum to a production position.

24 Claims, 3 Drawing Sheets

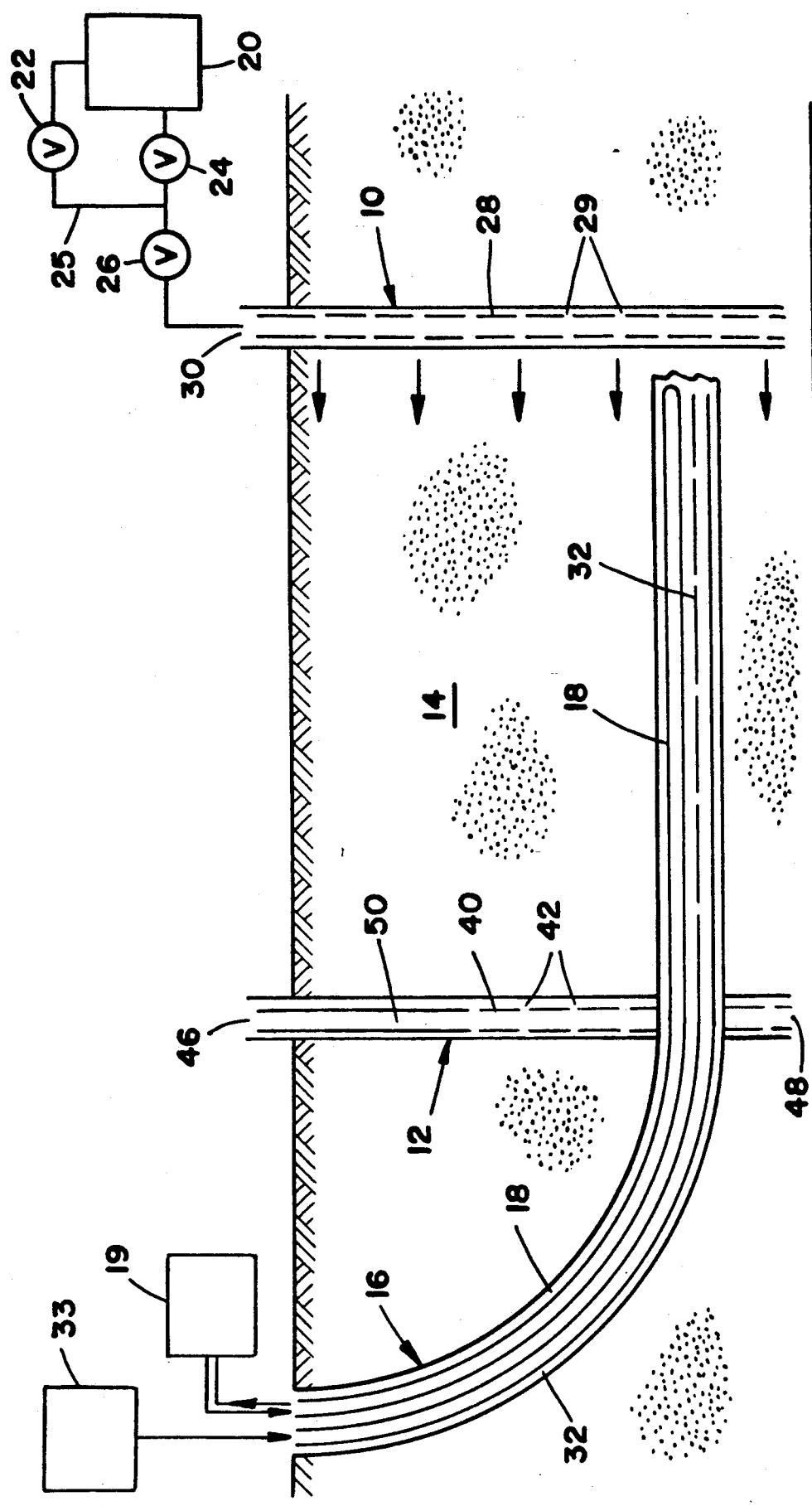
FIG_1

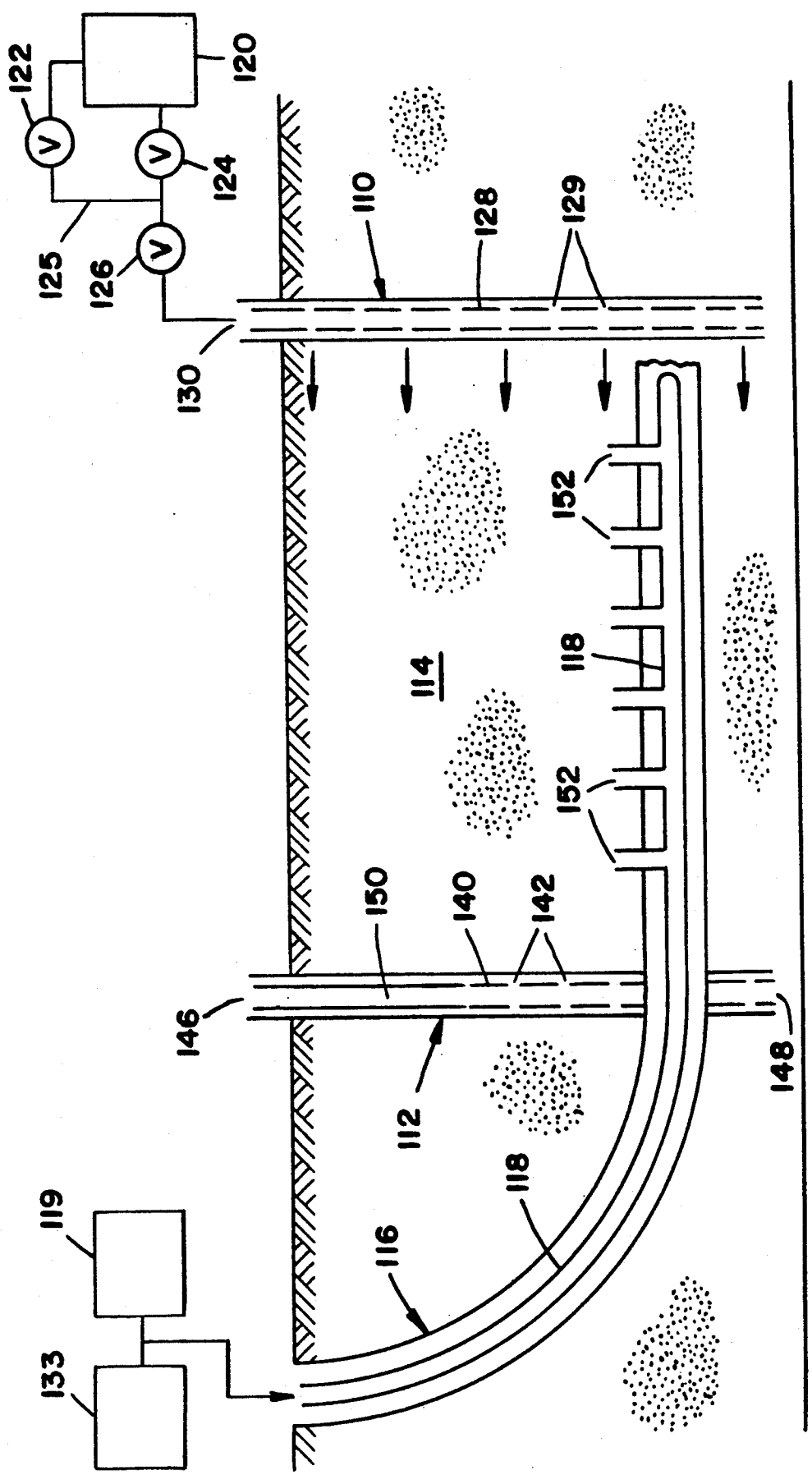
FIG_2

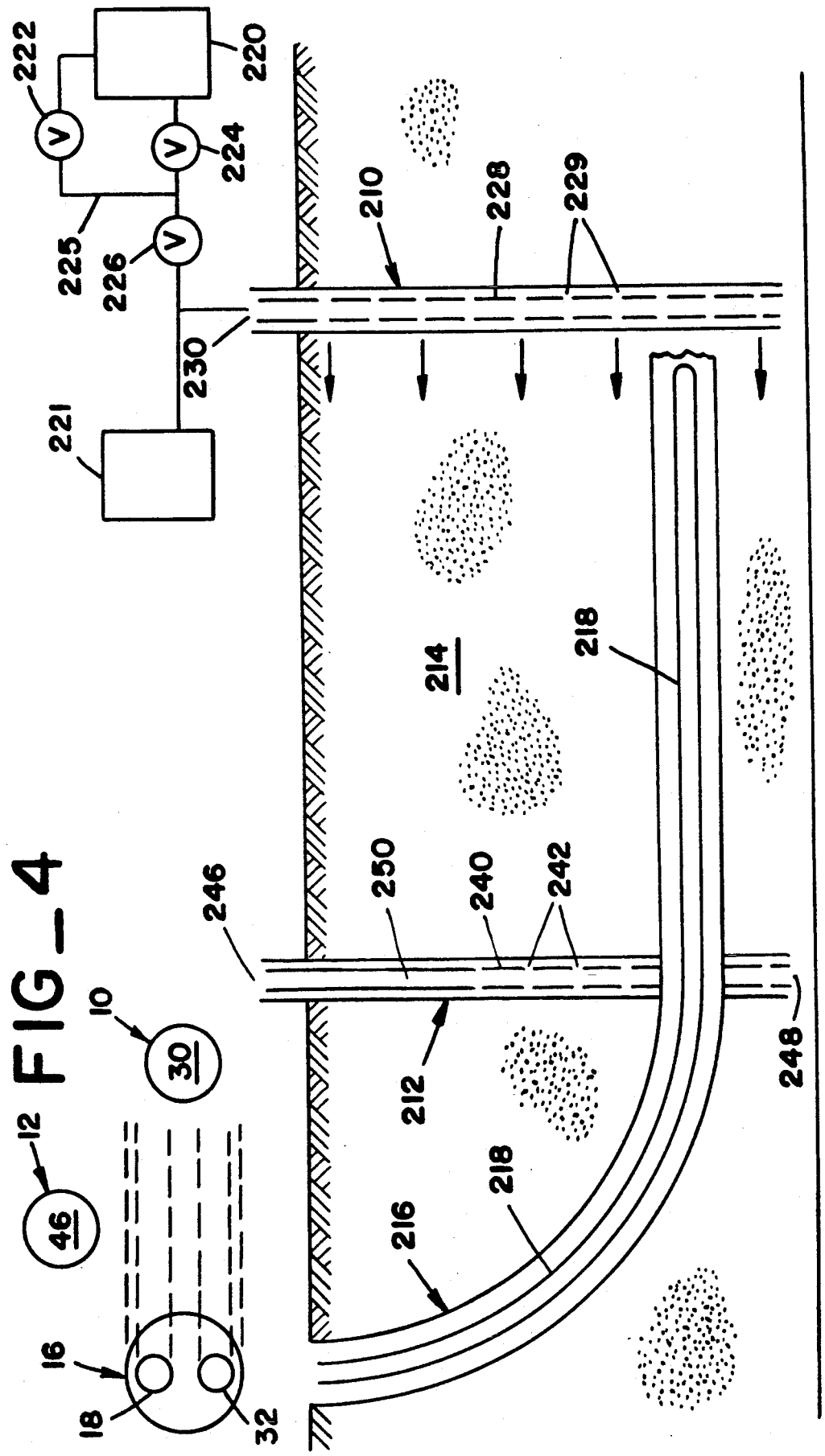

METHOD FOR IN-SITU HEATED ANNULUS REFINING PROCESS

CROSS-REFERENCE TO RELATED APPLICATIONS

This is a continuation-in-part of prior co-pending application Ser. No. 562,779, filed Aug. 3, 1990, and now U.S. Pat. No. 5,054,551.

BACKGROUND OF THE INVENTION

This invention is directed to a process of recovering petroleum from underground reservoirs.

Some of the largest known liquid petroleum deposits in the world are the Athabasca tar sands located in northern Alberta. Moreover, the high-viscosity crude petroleum in these oil sands is not recoverable in its natural state by ordinary in-situ methods. To date, none of these deposits has been produced commercially with much success, except by surface mining. Only two commercial mining operations exist, and they are in the shallow Athabasca deposits. Numerous processes have been employed in efforts to recover such material, including processes involving mining and centrifuging the tar sand in the presence of certain solvents and surface active agents, and subjecting the mined tar sand mixture to treatment with hot water to separate the resulting upper oil layer. These and other methods which have been used, however, all require large operational and capital expenditures.

In-situ technology as a means of commercially recovering Athabasca bitumen deposits of this type has never been employed However, there have been many in-situ well-to-well pilots, all of which have used some form of thermal recovery after establishing communication between an injector and a producer. Normally, such communication has been established by introducing a pancake fracture. The displacing or drive mechanism has been steam or combustion, such as the project at Gregoire Lake; or steam and chemicals, such as the early work on Lease 13 of the Athabasca deposit.

Another means of establishing communication is that proposed for the Peace River project. It is expected to develop well-to-well communication by injecting steam over a period of several years into an aquifer underlying the tar sand deposit at a depth of about 1800 feet.

Probably the most active in-situ commercial operation in the oil sands has been at Cold Lake. This project uses the huff-and-puff single-well method of steam stimulation and is producing about 88,000 barrels of viscous petroleum per day.

The most difficult problem in any in-situ well-to-well viscous petroleum project is establishing and maintaining communication between the injector and the producer. In shallow deposits, fracturing to the surface has occurred in a number of pilots so that satisfactory drive pressure and injectivity cannot be maintained. In typical steam applications, the produced oil flows from the hot zone through the unheated zone to the production well. In the heated zone, viscosity of the oil is at a minimum; however, as the pressure of the system forces the oil toward the producing well, the oil decreases in temperature to that of the unheated portion of the reservoir and mobility of the flowing oil decreases.

As noted, the major problem of the economic recovery from many formations has been establishing communications between an injection position and a recovery position in the viscous oil-containing formation. This is primarily due to the character of the formation, where oil mobility may be extremely low, and in some cases, such as the Athabasca tar sands, virtually nil. Thus, the Athabasca tar sands, for example, are strip mined where the overburden is limited. In some tar sands, hydraulic fracturing has been used to establish communication between injectors and producers. This, however, has not met with uniform success.

In-situ hydrogenation of heavy oils and tar sands based upon achieving hydrogenation temperatures by means of in-situ combustion has been used, but again, with little success. In order for hydrogenation to take place it is necessary to contact the oil with heat and hydrogen for a significant length of time so that enough of the reaction can take place to upgrade the oil so that it can be produced. In-situ combustion is a flow process and by its very nature tends to displace the oil in the formation. Thus, the temperature in the formation closest to the combustion zone is suitable for hydrogenation; however, the farther away from this area the more unlikely it is that the temperature conditions will promote hydrogenation, there presently exists no method for regulating temperature throughout the formation.

Heretofore, many processes have been utilized in attempting to recover viscous petroleum from viscous formations of the Athabasca tar sands type. The application of heat to such viscous petroleum formation by steam or underground combustion has been attempted. The use of slotted liners positioned in the viscous oil formation as a conduit for hot fluids has also been suggested. In-situ hydrogenation based upon achieving hydrogenation temperatures in the formation has also been tried. However, these methods have not been overly successful because of the difficulty of establishing and maintaining communication between the injector and the producer.

A solution to this problem of establishing communication between the injector and producer has been disclosed in U.S. Pat. Nos. 4,696,345; 4,460,044; 4,368,781; 4,303,126; 4,120,357; 4,037,658; 4,020,901; 4,019,575; 4,008,765; 3,994,341 and 3,994,340, which are incorporated by reference to show a HASDrive (Heated Annulus Steam Drive) method. None of these references disclose the addition of a hydrogen-generating or hydrogen-containing gas or a sufficient temperature being established in the formation to promote the hydrogenation and cracking of at least a portion of the petroleum in said formation zone. Nor do they disclose the addition of a catalyst into the formation.

In 1989, at Ft. McMurray in Northern Alberta, Canada, the HASDrive system was tested by the Alberta Oil Sands Technology and Research Authority, and was proven to be successful.

BRIEF DESCRIPTION OF THE INVENTION

The present invention is directed to a method of assisting the recovery of viscous petroleum from a petroleum-containing formation and is particularly useful in those formations where communication between an injector and a producer is difficult to establish and maintain. A hole is formed through the petroleum-containing formation and a solid-wall, hollow tubular member is inserted into the hole to provide a continuous, uninterrupted flow path through the formation. Pursuant to the teaching of the HASDrive process, a hot fluid is flowed through the interior of the tubular member, out of contact with the formation, to heat viscous petroleum in the formation outside the tubular member in order to reduce the viscosity of at least a portion of the petroleum adjacent to the outside of the tubular member, thereby providing a potential passage for fluid flow through the formation adjacent the outside of the tubular member.

A hydrogen-generating or hydrogen-containing gas (hereinafter referred to for the purpose of this discussion as a "hydrogenizing" gas) is injected into the formation through the passage to promote in-situ cracking and hydrogenation of at least a portion of the petroleum. This hydrogenation and cracking reaction is enhanced by the catalysis which occurs as a result of mineral deposits located within the formation. Depending on the resulting reaction rate, further catalysis can be initiated by the addition of an independent catalyst, preferably one containing metal, into the formation through the fluid flow passage established by the HAS-Drive process. A drive fluid is also injected into the formation through the passage to promote movement of the petroleum for recovery from the formation. In preferred form the hot fluid which is flowed through the tubular member is steam, and the drive fluid used to promote movement of the petroleum is also steam. Depending on certain conditions, the hot fluid, hydrogenizing gas, the drive fluid and if required depending on the resulting reaction rate, a catalyst, are injected simultaneously. Under other conditions, the hot fluid, hydrogenizing gas, the drive fluid and if required, the catalyst, are injected intermittently. The injectivity of the drive fluid into the formation is controlled to some extent by adjusting the flow of hot fluid through the tubular member. In this manner, the sweep efficiency of the drive fluid in the formation may be improved.

In one form, the present invention deals with the recovery of viscous petroleum from a tar sand formation of an Athabasca type. An injection well and a recovery well are formed and extended from the earth's surface through the tar sand formation. A hole is formed through the tar sand formation between the injection well and the recovery well, and a solid-wall, hollow tubular member is inserted into the hole to provide a continuous, uninterrupted flow path from the injection well to the recovery well through the tar sand formation. Following the HASDrive process, a hot fluid, preferably steam, is flowed through the interior of the tubular member, out of contact with the tar sand formation, to heat viscous petroleum in the tar sand formation between the injection well and the recovery well outside the tubular member, thereby reducing the viscosity of at least a portion of the petroleum adjacent the outside of the tubular member, and providing a potential passage for fluid flow through the tar sand formation adjacent the outside of the tubular member. A hydrogenizing gas is injected into the formation, either through the passage, the injection well, the first hollow, solid-wall tubular member, or a second, separate, tubular member, to promote in-situ hydrogenation and cracking of at least a portion of the petroleum. Hydrogenation and cracking conditions are enhanced by the temperature of the hot fluid flowing through the hollow, solid-wall tubular member and the catalysis initiated the hot fluids reacting with in-situ formation minerals or a separately injected catalyst.

A drive fluid is injected from the injection well into the formation through the passage to promote flow of petroleum toward the recovery well, where the petroleum is recovered. As noted, the preferred hot fluid is steam, although other fluids may be used. Steam also is preferred for use as a drive fluid, however, in some situations, other fluids such as gas or water may be useful drive fluids.

OBJECT OF THE INVENTION

The principle object of the present invention is to maximize recovery of viscous petroleum from a petroleum-containing formation, wherein communication between an injector position and a producer position is difficult to establish and maintain, by utilizing a hot fluid in a flow path through the formation to assist in establishing and maintaining communication. A hydrogen-generating or hydrogen-containing gas (defined herein as a "hydrogenizing" gas) and formation minerals acting as a catalyst are used to promote hydrogenation and cracking of at least a portion of the petroleum; while a drive fluid is used to promote movement of the petroleum to the producer. Depending on reaction rates obtained during the hydrogenation and cracking process, the present invention provides for a method of enhancing these rates further by injection of an independent catalyst through the established fluid flow path. Further objects and advantages of the present invention will become apparent when the description is read in view of the accompanying drawings which are made part of this specification.

BRIEF DESCRIPTION OF THE DRAWINGS

FIG. 1 is an elevation view partially in section and illustrates the embodiment of apparatus assembled in accordance with the present invention for use in recovering viscous petroleum from an underground formation;

FIG. 2 is an elevation view partially in section and illustrates an alternative arrangement of apparatus assembled in accordance with the present invention;

FIG. 3 is an elevation view partially in section and illustrates an alternative arrangement of apparatus assembled in accordance with the present invention.

FIG. 4 is a view that illustrates the possible configuration of the wells assembled in accordance with the present invention.

DETAILED DESCRIPTION OF THE EMBODIMENTS OF THE INVENTION

Refer now to the drawings, and to FIG. 1 and FIG. 4 in particular, where the preferred embodiment of apparatus assembled in accordance with the invention is illustrated. FIG. 1 shows a pair of spaced-apart wells, indicated generally by the numerals 10 and 12, which penetrate the earth to a viscous petroleum or tar sand formation 14. For ease in description, well 10 will be termed an injector well and well 12 will be termed a producer well. A hole 16 is formed between the injector well 10 and the producer well 12 and a solid-wall, hollow tubular member 18 is inserted through the hole 16. The tubular member 18 is preferably steel and may be made up of one piece or many connecting joints. The solid-wall, hollow tubular member 18, in following the HASDrive process, provides a continuous, uninterrupted flow path through the viscous petroleum-containing formation 14, and comprises two pipes arranged concentrically in order to provide said continuous flow. A second slotted tubular member 32 is inserted into the hole 16 between the injector well 10 and the producer well 12. The second slotted tubular member 32 is preferably steel and may be made up of one piece or many connecting joints.

The injection well 10 is cased by a casing string 28. The casing is perforated or slotted in the tar sand zone, as indicated by the numeral 29. The upper end of the casing 28 is closed by a wellhead indicated schematically as 30. A steam source 20 is connected through valves 26, 24 and 22, and suitable tubing 25, to injector well 10. Steam may be directed simultaneously or intermittently into the formation 14 via the casing perforations 29 of the injector well 10.

Control is exercised on the heat passing through the solid-wall hollow tubular member 18. Recoveries without the in-place tubular member were zero when the displacement mechanism was a simple conventional steamdrive. This reasonably simulates conditions in much of the Athabasca deposit. Based on computer simulation of an in-place tubular member, and the method of the present invention, recoveries as high as 65% were predicted on displacing the petroleum with a steam drive. The method of the present invention would find application in heavy oil formations that are too deep for mining. Generally these would be petroleum sands with an overburden of, greater than 300 to 1000 feet.

The producer well 12 is cased by a suitable casing string 40. The casing is slotted or perforated in the tar sand zone, as indicated by the numeral 42. The upper end of the casing string 40 is closed by a wellhead 46. A means for lifting petroleum from the interior of producer well 12 is provided. For example, a pump 48 is used to lift petroleum through a production flow path 50 to the surface.

In operation, steam is introduced into the injection well 10 to attempt to obtain injection of steam into formation 14 through perforations 29. In most instances, in viscous tar sands little or no injection is obtained. In accordance with the invention steam or a hot fluid is flowed through the formation 14 via tubular member 18 from a steam source 19 following the HASDrive process. The steam or hot fluid flowing in tubular member 18 heats the viscous petroleum in formation 14 to reduce the viscosity of at least a portion of the petroleum adjacent the tubular member 18. Moreover, a hydrogen-generating or hydrogen-containing gas (defined herein as a "hydrogenizing" gas), which may contain some steam, is flowed through tubular member 32 into the formation 14 from a hydrogenizing gas source 33. The hydrogenizing gas flowing in slotted tubular member 32 and into the formation 14 helps to promote hydrogenation and cracking of at least a portion of the viscous petroleum; these hydrogenation and cracking reactions are further enhanced by in-situ formation minerals acting as catalyzing agents for said reactions. The steam flowing through tubular member 18 controls the temperature in the formation 14 to help promote ideal conditions for catalysis, and for the hydrogenation and thermal cracking reactions to take place, thereby reducing the viscosity in at least a portion of the petroleum in formation 14. This enhances the HASDrive process, wherein that process a potential passage for flow of the drive fluid or steam through the formation 14 via the perforations 29 is created. By suitably controlling the flow in the tubular members 18 and 32 and the formation 14, a good sweep efficiency can be obtained and oil recovery maximized. The hydrogenation and cracking reactions also help promote an upgrading of the oil. As is known in the art, by hydrogenating oil it becomes a more valuable product. Moreover, hydrogenation and thermal cracking increase the mobility of oil and thus, transportation of such is made simpler. Finally, hydrogenation and thermal cracking promote lowering of the oil viscosity and thus, water is separated easier making the processing of the recovered oil more economical. Thus, the steam flowing in tubular member 18 and hydrogenizing gas flowing in tubular member 32 establish injectivity for the drive fluid into the formation and results in some production of petroleum from the producer. Sufficient steam is flowed through the tubular member to maintain injectivity of the drive fluid, and a temperature high enough to achieve hydrogenation and thermal cracking of at least a portion of the oil.

Depending on the resulting hydrogenation and thermal cracking rates obtained, a catalyst of the type generally known to those familiar with hydrogenation and thermal cracking processes, and preferably a metal-containing catalyst, may be injected through slotted tubular member 32 into formation 14 to further enhance said rates. The catalyst is injected either before the hot fluid injection or during the hot fluid injection, or both, in a continuous or intermittent pattern. The catalyst can be a gaseous form, liquid solution or slurry. Preferably, the catalyst will be either a liquid solution or slurry form. Depending on conditions of sufficient heat in the passage, minerals contained within the formation itself may catalyze the hydrogenation and thermal cracking reactions, thereby enhancing the effect of the injected catalyst or making independent injection of a catalyst unnecessary to aid in the hydrogenation and cracking of at least a portion of the oil.

FIG. 4 shows the configuration of producer well wellhead 46 and the injection well wellhead 30. The hole 16 is formed between the injector well 10 and the producer well 12. In one embodiment, solid-wall concentric tubular members 18 and slotted tubular member 32 are inserted through the hole 16.

FIG. 2 is an elevation view partially in section and illustrates an alternative arrangement of apparatus assembled in accordance with the present invention. FIG. 2 shows an injector well 110 and a producer well 112. A hole 116 is formed between the injector well 110 and the producer well 112. The producer well 112 is cased by a suitable casing string 140. The casing 140 is slotted or perforated in the tar sand zone as indicated by numeral 142. The upper end of producer casing string 140 is closed by a wellhead 146. A means for lifting petroleum from the interior of producer well 112 is provided. For example, a pump 148 is used to lift petroleum through a production flow path 150 to the surface.

In this embodiment of the invention, a solid-wall, hollow tubular member 118 is inserted through hole 116, in accordance with the HASDrive method, to provide a continuous, uninterrupted flow path through the viscous petroleum-containing formation 114. The solid-wall, hollow tubular member 118 is equipped with flow chokes 152.

The injection well 110 is cased by a suitable casing string 128. The casing is perforated or slotted in the tar sand zone, as indicated by numeral 129. The upper end of the casing 128 is closed by a wellhead indicated schematically as 130. A steam source 120 is connected through valves 126, 124 and 122 and suitable tubing 125 to injector well 110.

In accordance with the invention, steam and a hydrogenizing gas is flowed through tubular member 118 from steam and hydrogenizing gas sources 119 and 133, respectively. As in the previous embodiment, this occurs either after or during the injection of a catalyst into the formation 114 if hydrogenation and thermal cracking rates dictate that a catalyzing agent, in addition to catalysis resulting from formation minerals, is necessary. The steam and hydrogenizing gas flowing through tubular member 118 heats the viscous petroleum in formation !14 to reduce the viscosity of at least a portion of the petroleum adjacent to the tubular member 118. Said steam and hydrogenizing gas escapes through the flow chokes 152 into the formation 114. The hydrogenizing gas and catalyzing agents help promote in-situ hydrogenation and thermal cracking of the viscous petroleum in 114, while the steam helps to promote viscosity reduction of at least a portion of the petroleum in the formation !14, and helps optimize the conditions needed for in-situ hydrogenation and thermal cracking.

Thus, when the steam and hydrogenizing gas flowing in tubular member 118 establish injectivity, a potential passage for flow of the drive fluid or steam through the formation 114 via perforations 129 is created. This drive fluid or steam flowing through the perforations 129 flows the viscous petroleum towards the producer well 1!2 for recovery.

FIG. 3 is an elevation view partially in section and illustrates an alternative arrangement of apparatus assembled in accordance with the present invention. FIG. 3 shows a production well 212 and an injection well 210. A hole 216 is formed between the injector well 210 and the producer well 212. The producer well 212 and the injector well 210 are cased by suitable casing strings 240 and 228. The casings 240 and 228 are slotted or perforated in the tar sand zone, as indicated by numerals 242 and 229, respectively. The upper end of the producer casing 240 is capped by a wellhead 246 and the upper end of the injector casing 228 is capped by a wellhead 230.

In this embodiment of the invention, a solid-wall, hollow tubular member 218 is inserted through the hole 216. This tubular member 218, in accordance with the HASDrive process, provides a continuous, uninterrupted flow path through the viscous petroleum-containing formation 214.

A steam source 220 and hydrogenizing gas source 221 is connected through valve 226, 224 and 222, and suitable tubing 225, to injector well 210. In accordance with the invention steam is flowed through tubular member 218 from a steam source as in accordance with previous embodiments. As in previous embodiments, and depending on the temperature and pressure conditions within the wellbore, minerals contained within the formation may be used as a catalyzing agent alone, or in conjunction with a catalyst injected into formation 114 through perforations 229, either before and/or during the steam and hydrogenizing gas injection. This steam heats at least a portion of the petroleum adjacent the tubular member 218. Thus, when the steam flowing in tubular member 218 establishes injectivity, a potential passage for drive fluid or steam through the formation 214 via the injector well casing perforations 229 is viable. Along with the drive fluid or steam passing through the perforations 229, a hydrogenizing gas also flows through the injector well 210 into the petroleum-containing formation 214 via the casing perforations or slots 229.

The hydrogenizing gas and catalyst help promote in-situ hydrogenation and thermal cracking of at least a portion of the viscous petroleum. The heat transfer of the steam through the tubular member 218 helps maintain a suitable temperature, along the flow path from injector to producer, to help promote catalysis, as well as the hydrogenation and thermal cracking reactions.

By suitably controlling the flow of steam through the tubular member 218, and steam and hydrogenizing gas through the formation 214 via the casing slots 229, which can take place either simultaneously or intermittently, a good sweep efficiency can be obtained.

The steam or drive fluid flowing through the formation 214, via the casing perforations or slots 229, flows at least a portion of the viscous petroleum towards the producer well 212, where it is recovered through the producer well casing slots or perforations 242. A petroleum lifting means, such as pump 248 is provided to flow the petroleum through a production flow path 248 and out of the producer well.

Several embodiments of the present invention have been described in detail. The invention, however, is not limited to any of these specific embodiments but is meant to include all modifications coming within the terms of the claims.

What is claimed is:

1. A method of assisting the recovery of viscous petroleum from a petroleum-containing formation comprising:
   (a) forming a hole through a petroleum-containing formation to provide a flow path in said formation for flow of fluid through at least a portion of said formation;
   (b) flowing a hot fluid through said flow path out of contact with said formation to heat viscous petroleum in said formation outside said flow path to reduce viscosity of at least a portion of said petroleum adjacent to the outside of said flow path to provide a potential passage for fluid flow through said formation adjacent the outside of said flow path; and
   (c) injecting a drive fluid and a hydrogenizing gas through said passage at a temperature sufficient to promote hydrogenation and thermal cracking of at least a portion of the petroleum in said formation zone to promote movement of at least a portion of the petroleum through said passage adjacent to the outside of said flow path to a recovery position for recovery from said formation; and
   (d) catalyzing said hydrogenation and thermal cracking reactions within the formation zone to enhance said hydrogenation and thermal cracking of at least a portion of the petroleum in said formation zone.

2. The method of claim 1 wherein a metal-containing catalyst is used to catalyze said hydrogenation and thermal reactions cracking.

3. The method of claim 1 wherein an in-situ formation mineral is used to catalyze said hydrogenation and thermal reactions cracking.

4. The method of claim 1 wherein the drive fluid is steam.

5. The method of claim 1 wherein the hot fluid is superheated steam.

6. The method of claim 1 wherein the hydrogenizing gas is one of the following: $H_2$, $H_2/CO$, $H_2/CO$ mixtures or CO.

7. The method of claim 2 wherein the catalyst is introduced into the formation by injecting said catalyst through said fluid flow passages, said catalyst being in the form of a slurry.

8. The method of claim 2 wherein the catalyst is introduced into the formation by injecting said catalyst through said fluid flow passages, said catalyst being in the form of a solution.

9. The method of claim 7 or 8 wherein the drive fluid, hot fluid, and hydrogenizing gas and catalyst are injected simultaneously.

10. The method of claim 1 wherein the hydrogenizing gas is synthesis gas from a petroleum reformer.

11. The method of claim 1 wherein the hydrogenizing gas is mixed within said drive fluid.

12. The method of claim 1 wherein the hydrogenizing gas is mixed within said hot fluid.

13. A method of assisting the recovery and upgrading of petroleum from heavy viscous tar sand comprising:
   (a) forming a hole through heavy viscous tar sands;
   (b) inserting a solid-wall, hollow tubular member into said hole to provide a continuous, uninterrupted flow path through said heavy viscous tar sands;
   (c) injecting a catalyst along said hollow tubular member into said hole to promote hydrogenation and thermal cracking of at least a portion of the heavy tar sands;
   (d) injecting steam through the interior of said tubular member out of contact with said heavy viscous tar sands to heat said heavy viscous tar sands outside said tubular member to reduce the viscosity of at least a portion of the heavy viscous tar sands adjacent the outside of said tubular member to provide a potential passage for fluid flow through said heavy viscous tar sands adjacent said tubular member;
   (e) injecting a hydrogenizing gas through said flow path in order to promote hydrogenation and thermal cracking of at least a portion of the heavy viscous tar sands at a temperature determined by the temperature of said steam flowing through the interior of said first tubular member; and
   (f) injecting a drive fluid into said heavy viscous tar sands through said passage adjacent the outside of said tubular member to promote movement of at least a portion of the heavy viscous tar sands through said passage adjacent to the outside of said tubular member to a recovery position for recovery from said heavy viscous tar sands.

14. The method of claim 13 wherein said steam is superheated.

15. The method of claim 13 wherein said hydrogenizing gas is one of the following: $H_2/CO$, $H_2$, $H_2/CO$ mixtures or CO.

16. The method of claim 13 wherein said hydrogenizing gas is synthesis gas from a reformer process.

17. The method of claim 13 wherein said drive fluid catalyst, steam and hydrogenizing gas are injected simultaneously and continuously.

18. The method of claim 13 wherein said drive fluid catalyst, steam and hydrogenizing gas are injected intermittently.

19. The method of claim 13 wherein the drive fluid catalyst, steam and hydrogenizing gas are injected simultaneously for brief periods of time.

20. The method of claim 13 wherein said hydrogenizing gas and steam are injected simultaneously into said tubular member.

21. The method of claim 13 wherein said hydrogenizing gas is injected into a second tubular member which is adjacent and parallel to said solid-wall, hollow tubular member.

22. The method of claims 13 or 21 wherein said second tubular member is fixably attached to said solid-wall hollow tubular member.

23. The method of claim 13 wherein said hydrogenation is an exothermic reaction which generates heat, wherein at least a portion of said heat promotes viscosity reduction of said heavy viscous tar sands.

24. The method of claim 13 wherein said recovery position is located in said passage and said drive fluid is injected into said formation through a well penetrating the petroleum-containing formation in close proximity to said flow path.

* * * * *